(12) United States Patent
Schott et al.

(10) Patent No.: US 6,837,625 B2
(45) Date of Patent: Jan. 4, 2005

(54) FLEXIBLE SEAL TO REDUCE OPTICAL COMPONENT CONTAMINATION

(75) Inventors: Daniel Philip Schott, Sunnyvale, CA (US); Manish Sharma, Santa Clara, CA (US); Donald G. Dyke, Melbourne, FL (US); James Douglas Struttmann, Indialantic, FL (US); John Allen David, Malabar, FL (US); Theodore William Scone, Melbourne, FL (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/179,164

(22) Filed: Jun. 24, 2002

(65) Prior Publication Data
US 2003/0235372 A1 Dec. 25, 2003

(51) Int. Cl.[7] .................................................. G02B 6/38
(52) U.S. Cl. ........................................... 385/60; 385/79
(58) Field of Search ............................... 385/59, 60, 61, 385/66, 76, 78, 79, 80, 84, 86, 90, 92, 94

(56) References Cited

U.S. PATENT DOCUMENTS

| 4,204,743 | A | * | 5/1980 | Etaix ........................... 385/88 |
| 4,402,569 | A | * | 9/1983 | Bow et al. ..................... 385/79 |
| 4,606,603 | A | * | 8/1986 | Cairns .......................... 385/58 |
| 4,682,848 | A | * | 7/1987 | Cairns et al. .................. 385/69 |
| 5,210,815 | A | * | 5/1993 | Alexander et al. ........... 385/138 |
| 5,778,122 | A | * | 7/1998 | Giebel et al. .................. 385/55 |
| 6,019,519 | A | * | 2/2000 | Grinderslev et al. ........... 385/56 |
| 6,058,230 | A | * | 5/2000 | Ward ............................ 385/33 |
| 6,280,102 | B1 |   | 8/2001 | Go ............................... 385/94 |

* cited by examiner

Primary Examiner—Khiem Nguyen
(74) Attorney, Agent, or Firm—Workman Nydegger

(57) ABSTRACT

Various embodiments of methods and systems for reducing the amount of contamination that enters the optical path of an optical device are disclosed. In one embodiment, an optical device includes a housing containing at least one optical component (active, passive, or both) that is configured to process an optical signal. The optical device also includes a first sleeve that encloses a portion of an optical fiber, an optical path configured to convey the optical signal between the optical component(s) and the end of the optical fiber. A flexible seal contacts a portion of the surface of the first sleeve and contacts the surface of a portion of the housing through which the first sleeve passes.

37 Claims, 4 Drawing Sheets

FLEXIBLE SEAL TO REDUCE OPTICAL COMPONENT CONTAMINATION

BACKGROUND OF THE INVENTION

1. Field of the Invention

This invention relates to optical systems and, more particularly, to reducing contamination in optical devices.

2. Description of the Related Art

Many optical devices include mirrors, lenses, and other optic components that are used to process light. These optical components are often very sensitive to contamination. The presence of contaminants on the optic components may decrease the performance of an optical device. For example, the presence of contaminants may lead to an increase in a device's insertion loss. Insertion loss is total optical power loss caused by the insertion of an optical device into a system. The cleanliness of the optics may also affect signal to noise ratio and return loss.

One example of contamination occurs in high power optical systems. In these systems, dirt on the surface of an optical component may act as a tiny lens that locally focuses a light beam until the intensity burns a hole in the surface of that component (or a coating on that component), increasing the insertion loss of that component.

In order to reduce the possibility of contamination, great care is usually taken when handling optic components. Optical components are typically enclosed within sealed packages to prevent environmental contaminants such as dirt and water from coming into contact with the enclosed optical components. However, various processes used during the assembly process of optical devices may themselves create contaminants. For example, soldering, epoxy bonding, and laser welding may each produce contaminants through outgassing, smoking, and/or splashing (e.g., of flux). This contamination results in what is commonly referred to as "fogging" on the optics. Like other forms of contamination, this fogging may cause insertion loss or otherwise reduce performance.

SUMMARY

Various embodiments of methods and systems for reducing the amount of contamination that enters an optical device are disclosed. In one embodiment, an optical device includes a housing and a first sleeve that encloses a portion of an optical fiber. The first sleeve is received by a receiving portion of the housing. A flexible seal contacts a portion of the surface of the first sleeve and contacts the surface of the receiving portion of the housing.

In some embodiments, the flexible seal may be made from one or more materials such as plastics, rubber, polymers, glass, composites (e.g., fiberglass), and low-density open cell foams. The flexible seal may be positioned at or near a pivot point (which the first sleeve will be pivoted about during an process that aligns the end of the optical fiber with an optical component within the housing) of the first sleeve. The outer surface of the first sleeve may include a visual or physical indication, such as an indentation or an extrusion along all or part of a cross-sectional portion of the first sleeve, which constrains the placement of the flexible seal and/or identifies where the flexible seal should be positioned. The first sleeve may be part of a collimator assembly in some embodiments.

One embodiment of a method of assembling an optical device may include placing a flexible seal on a sleeve, inserting the sleeve into a receiving portion of a housing so that the flexible seal contacts a surface of the receiving portion of the housing, and affixing (e.g., soldering, welding, and/or epoxying) the sleeve to the housing. The sleeve encloses a portion of the optical fiber. The flexible seal inhibits contaminants generated during the affixing process from reaching an interior portion of the optical device.

Another embodiment of a method of assembling an optical device may involve placing a flexible seal into a receiving portion of a housing, inserting a sleeve into the receiving portion of the housing so that the flexible seal contacts a surface of the sleeve, where the sleeve encloses a portion of an optical fiber, and affixing the sleeve to the housing. Affixing the sleeve to the housing generates contaminants, and the flexible seal inhibits contamination of interior of the optical device by the contaminants.

In one embodiment, an optical device may include means for housing an optical component (e.g., a housing as shown in FIGS. 1 and 2) and means for enclosing a portion of an optical fiber (e.g., a sleeve that is part of a collimator assembly like the one shown in FIGS. 1 and 2). A receiving portion of the means for housing the optical component receives the means for enclosing the portion of the optical fiber. In some embodiments, the means for enclosing the portion of the optical fiber may include means for collimating light (e.g., a collimator lens like the ones shown in FIG. 2) output from the end of the optical fiber. The optical device also includes means for inhibiting contamination (e.g., a flexible seal like the one shown in FIGS. 1 and 2). The means for inhibiting contamination are coupled between the means for housing the optical component and the means for enclosing the portion of the optical fiber. The means for inhibiting contamination are flexible.

BRIEF DESCRIPTION OF THE DRAWINGS

A better understanding of the present invention can be obtained when the following detailed description is considered in conjunction with the following drawings, in which.

Figure 1:
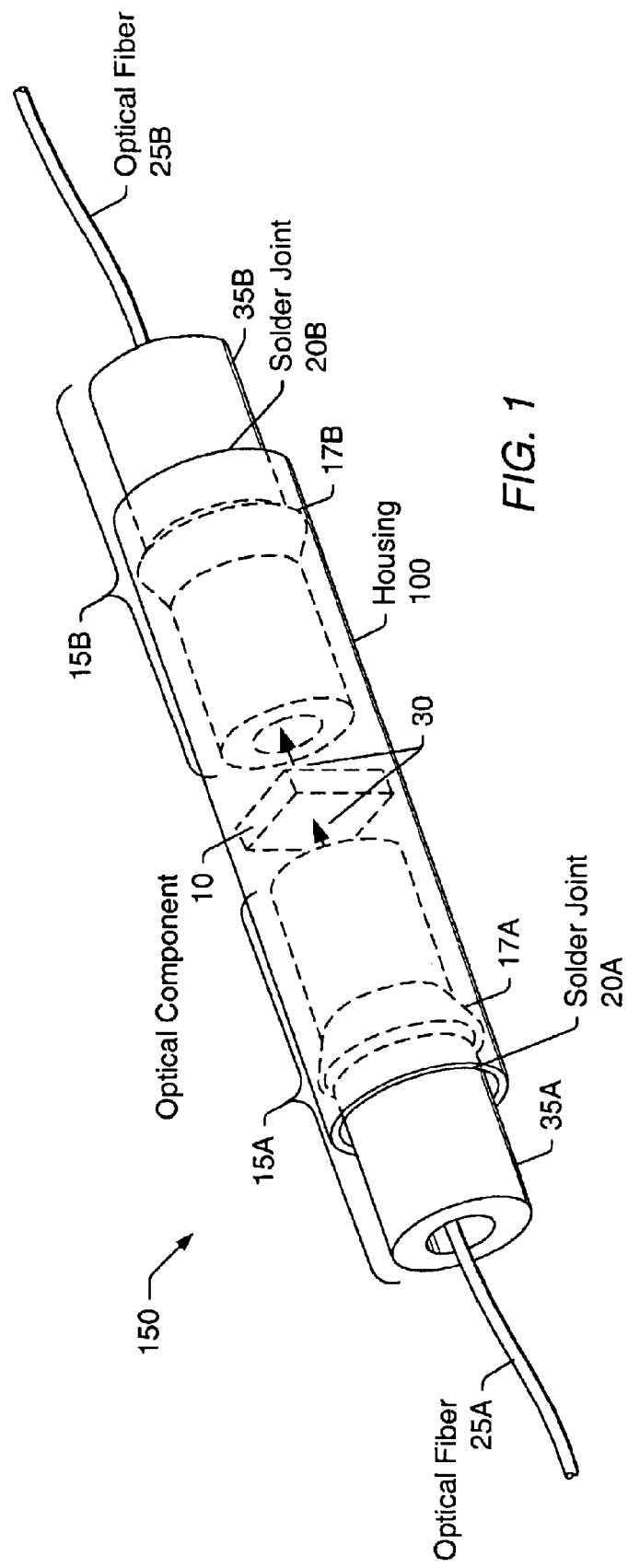
FIG. 1 shows an embodiment of an optical device that includes a flexible seal.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION OF EMBODIMENTS

FIG. 1 shows one embodiment of an optical device 150. Optical device 150 includes housing 100 and one or more passive optical components 10. Exemplary passive optical components include lenses, glass crystals, gratings, mirrors, etc. such as those used in passive devices like collimators, isolators, couplers, multiplexers, filters, power splitters, etc. In this embodiment, the housing 100 houses a passive optical component 10. Optical device 150 also includes two collimator assemblies 15A and 15B, which are attached to housing 100 at joints 20A and 20B (e.g., solder, weld, or epoxy joints) respectively. For simplicity, components with like reference numerals are collectively referred to by that reference numeral alone (e.g., collimator assemblies 15A and 15B are collectively referred to as collimator assemblies 15).

In this embodiment, a collimator assembly 15A introduces one end of an optical fiber 25A into housing 100. Collimator assembly 15A includes a collimating lens (not shown) that is configured to collimate an optical signal output from the end of optical fiber 25A and to provide the collimated signal to passive optical component 10. Each end of housing 100 receives one of the collimator assemblies 15.

Passive optical component 10 processes the collimated optical signal and outputs a processed optical signal. A second collimator assembly 15B may receive the processed optical signal output from passive optical component 10 and convey it to the end of a second optical fiber 25B. A second lens (not shown) inside second collimator assembly 15B may refocus the optical signal from passive optical component 10 into the end of optical fiber 25B.

Contaminants inside the housing may settle on the collimator lenses, the ends of the optical fibers 25, and/or the passive optical component 10. These contaminants may cause component damage to one or more of these components inside the housing, increasing the insertion loss of these components.

In this embodiment, passive optical component 10 is packaged in a tubular structure 100. Collimator assembly 15A includes sleeve 35A, which encloses a portion of optical fiber 25, and a collimating lens. The outer sleeve 35A of collimator assembly 15A may be made from a metal, plastic, or glass material. Housing 100 may be made of a metal material in some embodiments. The collimator assemblies 15A and 15B are partially inserted into the housing 100 and attached to the housing at joints 20A and 20B respectively. The collimator assemblies 15 may be attached by solder joints in some embodiments. In alternative embodiments, the collimator assemblies 15 may be attached by other means (e.g., welding, glass bonding, brazing, and/or epoxying). In order to reduce the amount of contaminants that enter optical path 30 (e.g., as a result of the process(es) used to attach collimator assemblies 15A and 15B to housing 100), a flexible seal 17A is placed between the outer surface of collimator assembly 15A and the inner surface of housing 100. A similar flexible seal 17B is placed between the outer surface of collimator assembly 15B and the inner surface of housing 100. Flexible seals 17 have some flexibility so that they may be placed between the a collimator assembly and an optical component housing during device assembly and so that they allow alignment of optical devices. Note that while housing 100 and sleeves 35 shown in this embodiment are both cylindrical structures, structures of different shapes may be used for the housing, the sleeves, or both in other embodiments. Generally, the shape of flexible seal 17 is such that flexible seal 17 contacts a surface of sleeve 35 and a surface of housing 100 in a way that forms a barrier against contaminants. For example, if both the housing and the sleeve are cylindrical, flexible seal 17 may be shaped as a circular ring.

Each flexible seal 17 forms a barrier against contaminants. For example, contaminants generated when sleeve 35A is soldered, welded and/or epoxied to housing 100 may be inhibited from entering optical path 30 by flexible seal 17A. While the barrier formed by each flexible seal 17 reduces the amount of contaminants that enter optical path 30, the flexible seals may not prevent all contaminants from entering (i.e., the barrier may not be hermetic) in some embodiments. In many embodiments, flexible seals 17 may not physically attach sleeves 35 to housing 100 (although in some embodiments, each flexible seal 17 may create a friction attachment between a sleeve and the housing that makes it more difficult to remove the sleeve from the housing once the sleeve and flexible seal have both been inserted into the housing).

It is noted that in other embodiments, a flexible seal 17 may be placed contacting other surfaces (e.g., the end surfaces) or either the housing or the sleeve instead of contacting the respective inner and/or outer surfaces of the housing and the sleeve (as shown in FIG. 1). In yet other embodiments, a flexible seal 17 may contact the end surfaces of both the housing and the sleeve in addition to contacting the respective inner and/or outer surfaces of the housing and the sleeve.

A flexible seal 17 may be made from materials such as plastics, rubbers, low-density open cell foams, metal foils, composites (e.g., fiberglass), glass, and/or polymers. The particular type and combination of materials used in a given embodiment may depend on factors such as the amount of heat the flexible seal 17 may be exposed to, the type of contaminant(s) the flexible seal 17 may be exposed to, the environment in which optical device 150 may be operated in, the intended lifetime of the optical device 150, and so on. For example, a flexible seal 17 may need to withstand certain temperatures during assembly and/or operation of optical device 150. Different materials may be better suited to operating under certain conditions than others, and thus materials may be selected based on the particular operating and/or assembly conditions expected for a given embodiment. In some embodiments, the material(s) included in the flexible seal 17 may be selected based on how much those materials outgas at the temperatures that the flexible seal 17 is expected to be exposed to during the assembly and lifetime of the optical device 150.

The temperatures that flexible seal 17 is exposed to during device assembly due to processes such as soldering, welding (e.g., laser welding, TIG (Tungsten Intert Gas) welding, or MIG (Metal Inert Gas) welding), or heating to cure epoxy may depend on the placement of flexible seal 17 relative to the area of the sleeve and/or housing that will be exposed to heat. Generally, the temperature of the flexible seal 17 may depend on the distance between the flexible seal 17 and the point (e.g., a joint 20) at which the heat is applied. As the distance between a flexible seal 17 and a heat source increases, the temperature of the flexible seal 17 decreases. Many materials outgas more at increased temperatures. Thus, if outgassing of flexible seal 17 is a concern, the amount of potential outgassing may be reduced by increasing the distance between the flexible seal 17 and the point(s) (e.g., joints 20) at which heat will be applied to the device 150 during assembly.

Figure 2:
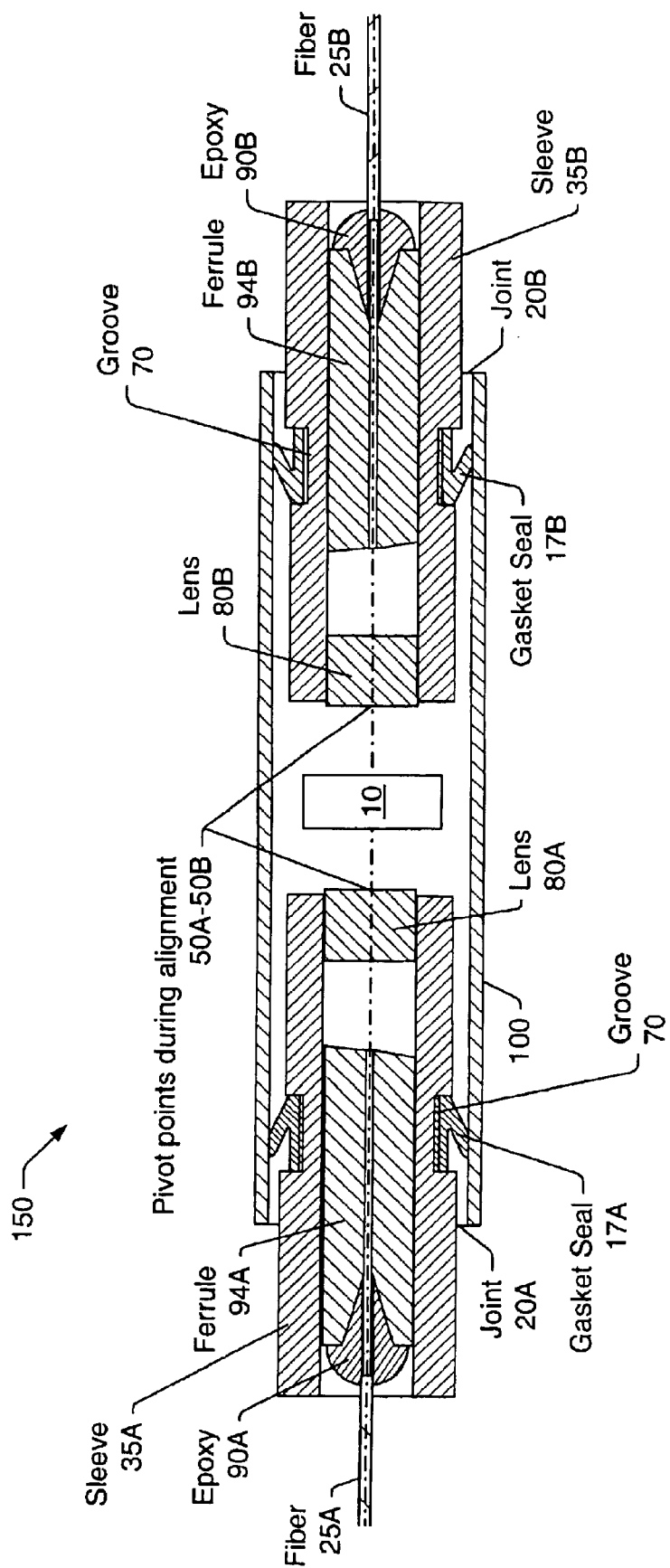
FIG. 2 shows a cutaway side view of one embodiment of an optical device that includes a flexible seal.

FIG. 2 shows a cutaway side view of one embodiment of optical device 150. This cutaway view shows the placement of an inner ferrule 94 and a collimator lens 80 (e.g., a Gradient Index (GRIN) lens) within each sleeve 35. As shown, each fiber 25 may be attached to the inner ferrule by a material such as epoxy 90 in some embodiments. Each ferrule 94 may be attached to a sleeve 35 by epoxy, solder, glass, etc.

Exemplary pivot points 50A and 50B for sleeves 35A and 35B are shown. Each sleeve 35 may be rotated about its respective pivot point 50 during device assembly so that an end of a fiber 25 and lenses 80A and 80B are aligned with an optical component 10 inside housing 100. For example, such an alignment process may be performed after sleeve 35A and seal 17A are inserted into housing 100 and before sleeve 35A is affixed to housing 100. In some embodiments, a flexible seal 17 may limit adjustment of a sleeve 35 about its pivot point 50. Potential restrictions on sleeve adjustment caused by a flexible seal 17 may be reduced by placing flexible seal 17 closer to a pivot point 50 around which a sleeve 35 is rotated during alignment.

In the embodiment shown in FIG. 2, each flexible seal 17 is a gasket with a frusto-conical surface. Note that in other embodiments, a flexible seal may be an o-ring with a circular, square, or other cross-section. In general, any type and/or shape of flexible seal 17 that, when placed between sleeve 35 and housing 100, reduces the amount of contaminants that enter an optical path within housing 100 may be used.

In some embodiments, flexible seal 17 may be attached to a sleeve 35 before sleeve 35 is inserted into housing 100. In many embodiments, each sleeve 35 may include an indication identifying a point at which a flexible seal 17 should be placed and/or constraining the movement and/or placement of the flexible seal. Such an indication may extend around a portion (or all) of the circumference of the sleeve at the location where the flexible seal 17 should be placed. For example, in the embodiment shown in FIG. 2, each of the collimator assembly sleeves 35 includes a groove 70 that indicates the position at which the flexible seal 17 should be placed. A person or machine attaching the flexible seal 17 to the sleeve 35 may roll, slide, or otherwise move the flexible seal 17 across the sleeve 35 until the flexible seal 17 is positioned within the groove 70. In another embodiment, an indication may include a circumferential line marked (e.g., drawn, etched, or painted) around the sleeve 35 at a point at which the flexible seal 17 should be located. Such a line may assist a human assembler or a machine assembler using machine vision to properly place the flexible seal 17 at the desired location on a sleeve 35. In yet another embodiment, the indication may include one or more raised portions (e.g., ridges) on the sleeve that indicate the position at which the flexible seal should be placed (e.g., two ridges may surround the portion of the sleeve on which the flexible seal should be placed). In some embodiments, the raised portion(s) may constrain the placement and/or movement of the flexible seal by making it physically difficult to place the flexible seal at a location on and/or beyond the raised portion. The desired location of the flexible seal may be a location on top of or next to the indication.

In some embodiments, flexible seal 17 may be inserted into housing 100 before sleeve 35 is inserted (e.g., the sleeve 35 may be inserted through the flexible seal 17 after the flexible seal 17 is already positioned within the housing 100). For example, flexible seal 17 may be a plastic sleeve or ring that is placed within housing 100 before sleeve 35 is inserted into the housing. In some of these embodiments, one or more physical and/or visual guides on housing 100 (e.g., on an inner surface of housing 100) may indicate where the flexible seal 17 should be placed within the housing 100. Guides on sleeve 35 may indicate where sleeve 35 should be positioned with respect to the flexible seal 17. These guides on housing 100 and/or sleeve 35 may include visual markings, physical indentations (e.g., grooves), and/or physical extrusions (e.g., ridges).

Figure 3:
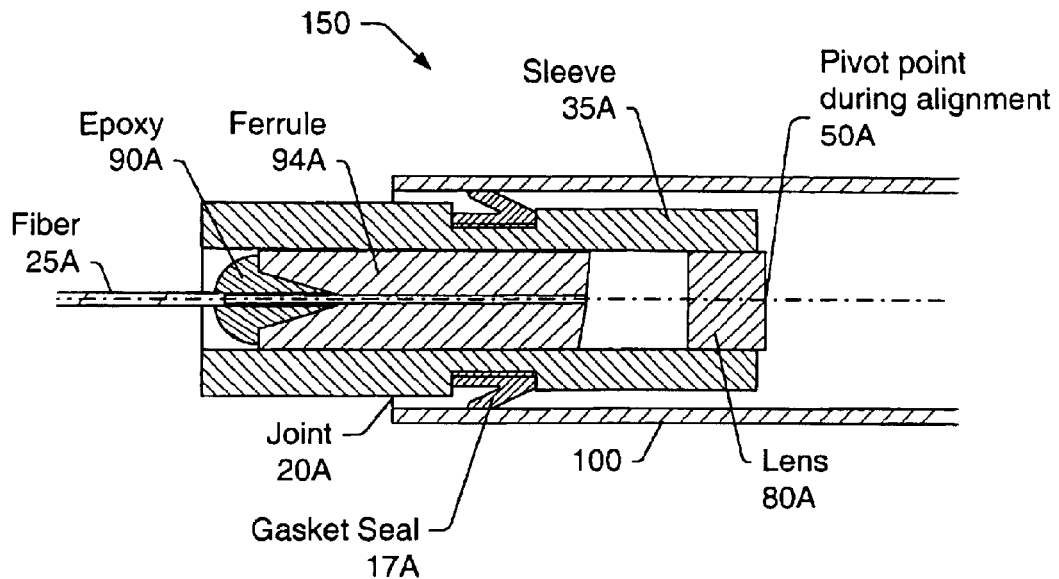
FIG. 3 shows a cutaway side view of another embodiment of an optical device that includes a flexible seal.

FIG. 3 shows a partial view of another embodiment of an optical device 150 that includes a flexible seal 17. In this embodiment, a receiving portion of housing 100 receives sleeve 35A. Sleeve 35A is part of a collimator assembly that may include a lens 80A, ferrule 94A, and a portion of fiber 25A in this embodiment. In one embodiment, optical device 150 may be a fiber-coupling device that couples fiber 25A to another fiber (not shown). In some embodiments, optical device 150 may contain additional optical components, as shown in FIGS. 1-2 and 4.

Figure 4:
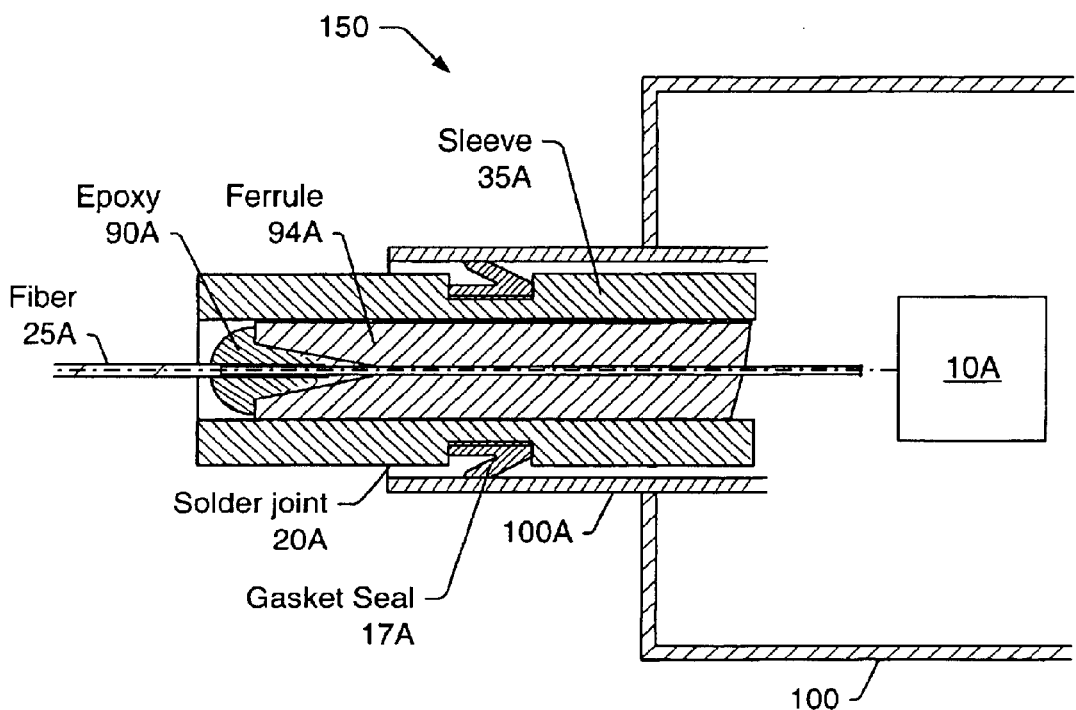
FIG. 4 shows a cutaway side view of yet another embodiment of an optical device that includes a flexible seal.

FIG. 4 shows an example of another embodiment of an optical device 150 in which a flexible seal 17 may be used to reduce the amount of contaminants that enter the optical device. In this embodiment, optical device 150 may contain one or more active optical components 10A. Exemplary active optical components 10A include laser diodes, photosensors, transmitters, receivers, modulators, attenuators, switches, amplifier pumps, semiconductor optical amplifiers, etc. and any associated optics (e.g., optics to allow efficient light coupling). Note that active and passive optical components may be integrated into the same housing. For example, a passive device (e.g., a collimator lens) may process a light signal output from an active device (e.g., a laser diode) for transmission in an optical fiber.

In this embodiment, active component 10A's housing 100 is not cylindrical in shape (e.g., active component 10A may be housed in a box). In this embodiment, a cylindrical receiving portion 100A of housing 100 receives sleeve 35. Note that while the receiving portion 100A is cylindrical in this embodiment, other embodiments may have differently shaped receiving portions. Additionally, in many embodiments, a receiving portion of a housing may be the same shape as the rest of the housing (e.g., as shown in FIGS. 1-3). A flexible seal 17 may be placed between sleeve 35 and the receiving portion of the housing 100 in order to reduce contamination. In some embodiments, the receiving portion 100A of the housing may be produced as a separate component that is eventually attached to the rest of housing 100 at some point during device assembly. In such embodiments, sleeve 35 and flexible seal 17 may be inserted into the receiving portion 100A (e.g., a ferrule) of the housing 100 before or after the receiving portion of the housing is attached to the rest of the housing. Flexible seal 17 may reduce the amount of contaminants that enter an interior portion of the housing 100.

In the embodiments shown in FIGS. 1-3, each sleeve 35 is part of a collimator assembly 15. Note that in some embodiments like the one shown in FIG. 4, a sleeve 35 may not be part of a collimator assembly 15. Instead, the sleeve 35 may part of a connecting device used to introduce an optical fiber 25 into a housing 100. Sleeve 35 may contain other passive components (in addition to or instead of a collimator lens) in some embodiments.

Figures 5, 6:
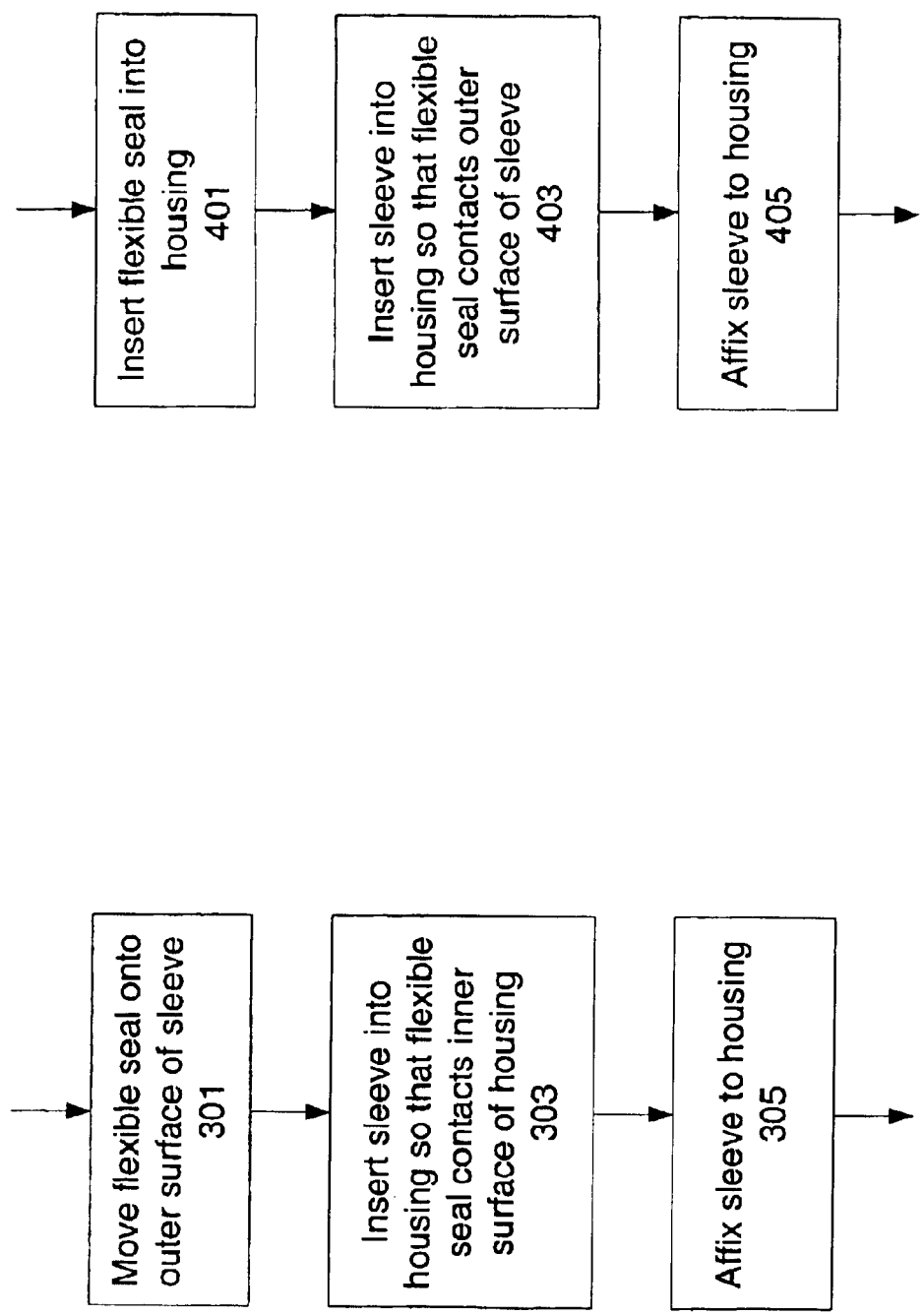
FIG. 5 shows one embodiment of a method of assembling an optical device.
FIG. 6 shows another embodiment of a method of assembling an optical device.

FIG. 5 is a flowchart of one embodiment of a method of assembling an optical device. In this embodiment, a flexible seal is moved onto a sleeve (e.g., a sleeve around a collimator assembly or a ferrule used to introduce an optical fiber into a component housing), as shown at 301. Moving the flexible seal may involve rolling, sliding, or otherwise moving the flexible seal from one end of the sleeve to a desired location along the sleeve. In some embodiments, the desired location of the flexible seal may be identified by an indication (e.g., a visual and/or physical marking) on the outer surface of the sleeve.

At 303, the sleeve is inserted into a receiving portion of a housing for an optical component so that the flexible seal contacts a surface of the receiving portion of the housing. In some embodiments, the receiving portion of the housing may be a ferrule that is attached to the remainder of the housing at some time after the sleeve in inserted into the receiving portion. In other embodiments, the receiving portion may already be integrated with the housing when the sleeve is inserted. At 305, the sleeve is affixed to the housing (e.g., by soldering, welding, and/or epoxying). Affixing the sleeve to the housing may generate contaminants, and the flexible seal reduces the amount of contaminants that enter an optical path within the housing.

FIG. 6 is a flowchart of another embodiment of a method of assembling an optical device. At 401, a flexible seal is inserted into a receiving portion of the housing for an optical component. In some embodiments, visual and/or physical indications may show the location at which the flexible seal should be placed within the receiving portion. At 405, a sleeve is inserted into the receiving portion of the housing so that the flexible seal contacts a surface of the sleeve and a surface of the receiving portion of the housing. The sleeve is affixed to the housing at 405. The process(es) used to affix the sleeve to the housing may generate contaminants. The flexible seal may reduce the amount of contaminants that enter an optical path within the housing.

Note that the embodiments shown in FIGS. 3 and 4 are merely exemplary and that other embodiments of assembly methods may also be used.

Numerous variations and modifications will become apparent to those skilled in the art once the above disclosure is fully appreciated. It is intended that the following claims be interpreted to embrace all such variations and modifications.

What is claimed is:

1. An optical device comprising:
   a housing at least partially enclosing an active optical component;
   a first sleeve enclosing a portion of an optical fiber, wherein the first sleeve is received by a receiving portion of the housing and is permanently fixed to the housing in a manner so as to substantially prevent longitudinal displacement of the sleeve relative to the housing; and
   a flexible seal contacting a portion of a surface or the first sleeve and contacting a surface of the receiving portion of the housing.

2. The optical device of claim 1, wherein the surface of the first sleeve comprises an inner surface of the first sleeve.

3. The optical device of claim 1, wherein the surface of the receiving portion of the housing comprises an outer surface of the first sleeve.

4. The optical device of claim 1, wherein the flexible seal comprises an o-ring surrounding the first sleeve.

5. The optical device of claim 1, wherein the flexible seal comprises an annular gasket extending around the first sleeve.

6. The optical device of claim 5, wherein the annular gasket is a frusto-conical gasket.

7. The optical device of claim 1, wherein the flexible seal is positioned to facilitate insertion of the first sleeve into the housing.

8. The optical device of claim 1, wherein the flexible seal is positioned to facilitate movement of the first sleeve during an alignment process.

9. The optical device of claim 1, wherein the first sleeve is fixed to the housing at a fixation area, wherein the flexible seal is positioned intermediate the fixation area and the interior of the housing.

10. The optical device of claim 1, wherein the housing contains at least one optical component configured to process an optical signal output from an end of the optical fiber.

11. The optical device of claim 1, wherein the flexible seal is configured to inhibit contaminants from entering a portion of the optical device interior to the housing.

12. The optical device of claim 11, wherein the flexible seal is configured to inhibit contaminants generated when the first sleeve is affixed to the housing from entering the portion of the optical device interior to the housing.

13. The optical device of claim 1, wherein the flexible seal comprises plastic.

14. The optical device of claim 1, wherein the flexible seal comprises glass.

15. The optical device of claim 1, wherein the flexible seal is positioned near a pivot point of the first sleeve.

16. The optical device of claim 1, wherein an outer surface of the first sleeve comprises a restraining portion configured to restrict movement of the flexible seal.

17. The optical device of claim 1, wherein an outer surface of the first sleeve comprises an indication of where the flexible seal should be positioned along the first sleeve.

18. The optical device of claim 17, wherein the indication comprises an indentation on the outer surface of the first sleeve.

19. The optical device of claim 17, wherein the indication extends around a circumference of the first sleeve.

20. The optical device of claim 1, wherein the first sleeve is part of a collimator assembly.

21. The optical device of claim 1, wherein the receiving portion of the housing comprises a ferrule.

22. A method of assembling an optical device, the method comprising:
    placing a flexible seal on an outer portion of a sleeve, wherein the sleeve encloses a portion of an optical fiber;
    inserting the sleeve into a receiving portion of a housing so that the flexible seal contacts a surface of the receiving portion of the housing;
    affixing the sleeve to the housing in a manner so as to substantially prevent longitudinal movement of the sleeve relative to the housing, wherein said affixing generates contaminants and the step of affixing comprises at least one of the following steps: soldering, welding, epoxying, brazing and glass bonding; and
    wherein the flexible seal prevents a portion of the contaminants from reaching a portion of the optical device interior to the housing.

23. The method of claim 22, wherein said placing comprises rolling the flexible seal onto the sleeve.

24. The method of claim 22, wherein the flexible seal comprises an o-ring.

25. The method of claim 22, wherein the flexible seal comprises an annular gasket.

26. The method of claim 22, wherein the flexible seal comprises rubber.

27. The method of claim 22, wherein said placing comprises rolling the flexible seal onto the sleeve until the flexible seal is positioned at a location identified by an indication on the outer surface of the sleeve.

28. A method of assembling an optical device, the method comprising:

placing a flexible seal into a receiving portion of a housing;

inserting a sleeve into the receiving portion of the housing so that the flexible seal contacts an outer surface of the sleeve, wherein the sleeve encloses a portion of an optical fiber is part of a collimator assembly;

affixing the sleeve to the housing in a manner so as to substantially prevent longitudinal movement of the sleeve relative to the housing, wherein said affixing generates contaminants; and the flexible seal inhibiting contamination of a portion of the optical device interior to the housing by the contaminants.

29. The method of claim 28, wherein said affixing comprises soldering.

30. The method of claim 28, wherein said affixing comprises welding.

31. The method of claim 28, wherein said affixing comprises epoxying.

32. The method of claim 28, wherein said inserting comprises moving the sleeve until the flexible seal is positioned at a location identified by an indication on the outer surface of the sleeve.

33. The method of claim 28, wherein the flexible seal comprises an o-ring.

34. The method of claim 28, wherein the flexible seal comprises an annular gasket.

35. The method of claim 28, wherein the flexible seal comprises plastic.

36. An optical device comprising:

a housing;

a first collimator assembly, wherein the first collimator assembly includes a first sleeve affixed to the housing and that surrounds a portion of a first optical fiber and a first lens configured to collimate light output from an end of the first optical fiber;

a first flexible seal contacting a portion of an outer surface of the first sleeve and contacting an inner surface of a first receiving portion of the housing that receives the first sleeve;

a second collimator assembly, wherein the second collimator assembly includes a second sleeve affixed to the housing and that surrounds a portion of a second optical fiber and a second lens configured to focus light into the end of the second optical fiber; and a second flexible seal contacting a portion of an outer surface of the second sleeve and contacting an inner surface of a second receiving portion of the housing that receives the second sleeve.

37. An optical device comprising:

a housing;

a sleeve formed as part of a collimator assembly, the sleeve enclosing a portion of an optical fiber, wherein the sleeve is received by a receiving portion of the housing and is permanently fixed to the housing in a manner so as to substantially prevent longitudinal displacement of the sleeve relative to the housing; and a flexible seal contacting a portion of a surface of the sleeve and contacting a surface of the receiving portion of the housing.

\* \* \* \* \*